Patented Apr. 30, 1929.

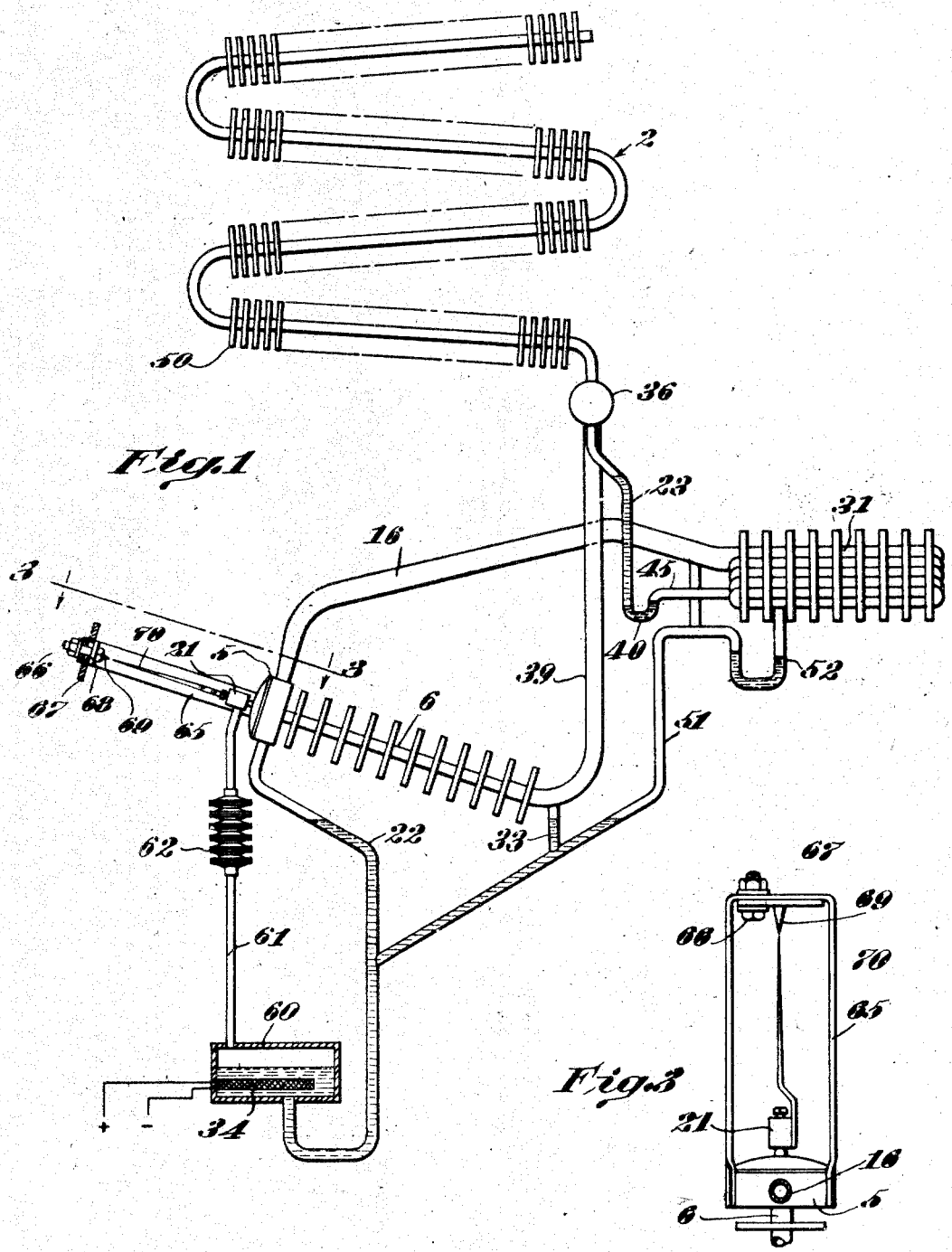

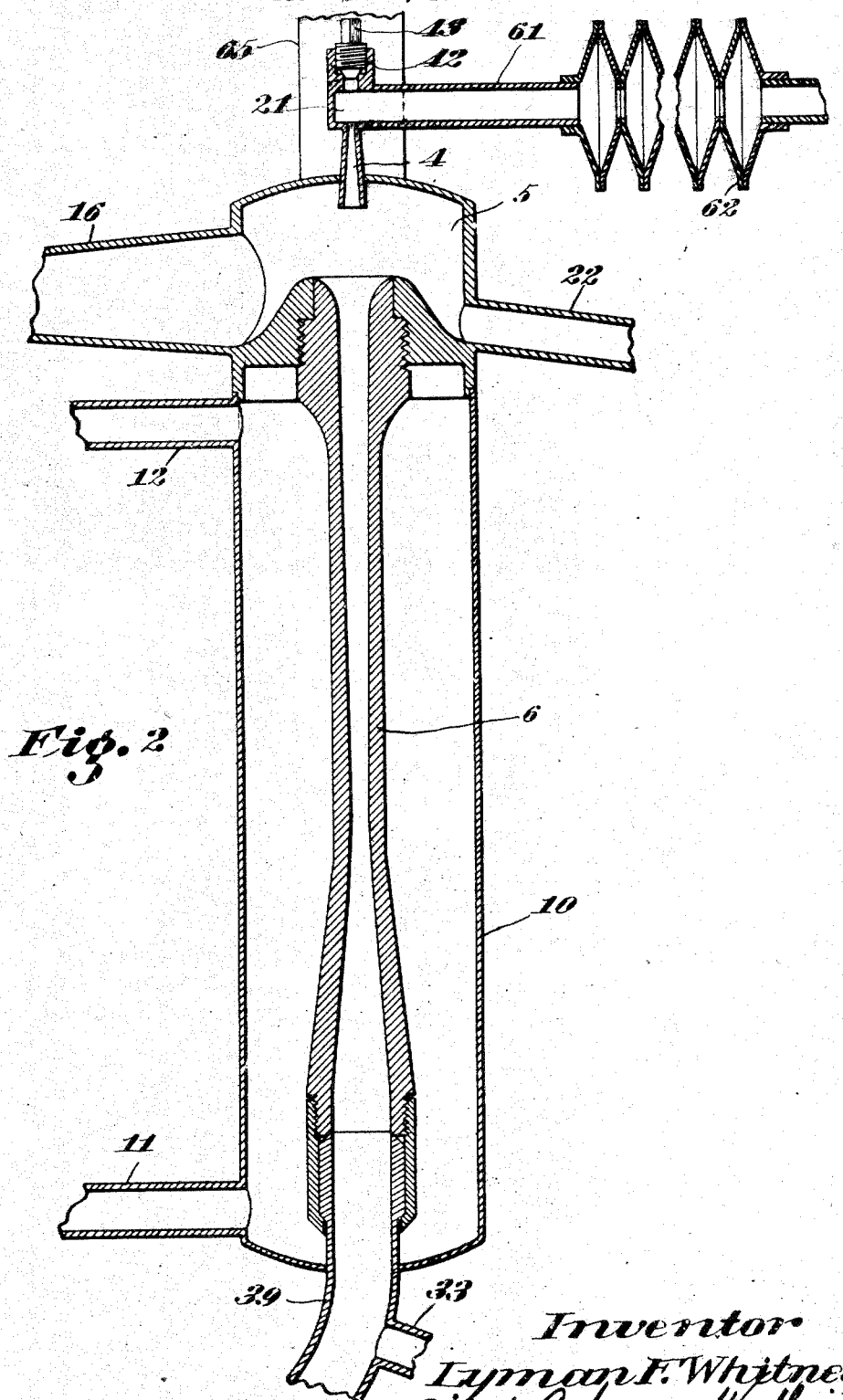

1,710,910

UNITED STATES PATENT OFFICE.

LYMAN F. WHITNEY, OF BOSTON, MASSACHUSETTS, ASSIGNOR, BY MESNE ASSIGNMENTS, TO STATOR REFRIGERATION, INC., A CORPORATION OF DELAWARE.

ASPIRATOR INSTALLATION.

Application filed January 6, 1927. Serial No. 159,346.

The present invention relates to an aspirator installation of the general type disclosed in the application of Eastman A. Weaver, Serial No. 733,699, filed August 23, 1924, as well as in the application of Ernest W. Wescott, Serial No. 163,372 and my copending applications, Serial Nos. 159,342, 159,343, 159,344, 159,345, filed on even date herewith.

While an aspirator of this type is more particularly intended for use in refrigerating systems of the character to which the aforesaid copending applications pertain, this invention is also of advantage wherever an aspirator receives a propellent fluid at high pressure and temperature and exhausts the propellent fluid into a mixing or head chamber at a decidedly lower temperature and pressure at the same time imparting considerable velocity and an increased pressure to the molecules of the propelled fluid which are entrained by the propellant. More particularly an aspirator installation having the characteristics illustrated herein will be found of advantage when it is desirable to minimize the conduction of heat between the high temperature inlet end of the aspirator nozzle and the outlet thereof, as, for example in refrigerating apparatus or in any thermodynamic system in which heat conduction between these parts of the aspirator is especially objectionable. One aspect of the present invention relates to means whereby the hot end of the nozzle is located without the mixing chamber and indeed outside of the main body of the aspirator installation and whereby the aspirator tube or nozzle of low heat conductivity may form the major or sole path of heat conduction between adjoining parts of the assembly which are at widely different temperatures, so that a minimum flow of heat may occur between the vaporizer and the mixing chamber and related parts. Since unnecessary conduction of heat from the propellent vaporizer is thus avoided, a marked saving in operating cost results, while condensation of the propellent vapor as it leaves the mixing chamber is possible with a much smaller cooling area than would otherwise be possible. In combination with this arrangement, the end of the nozzle preferably projects into the mixing chamber, so that entraining of pumped fluid may be more advantageously effected than if the nozzle were not so arranged.

The invention further pertains to the provision of a connecting duct between the hot end or inlet of the aspirator nozzle and the source of vaporized propellent fluid such as a vaporizer or boiler, which will supply the nozzle with hot propellent fluid and will therefore be subject to considerable tendency for expansion due to temperature change, but which is constructed to protect the nozzle against undue strain or tendency to move out of alignment with the compression funnel into which the mixture of propellant and propelled fluid flows. This feature of the invention in its more specific aspect relates to the provision of a flexible or expansible coupling such as a metal bellows in the propellant duct to permit the expansion of that duct under high temperature without throwing undue strain upon the single connection formed by the nozzle. In combination with the last-named feature, indicating means are provided so that the aspirator nozzle may be easily returned to its proper aligned position in relation to the compression funnel, if for any reason it should be accidentally displaced.

A further aspect of the invention relates to the arrangement of an outlet for exhausted or condensed propellent fluid adjoining the nozzle outlet whereby gradual filling of the mixing chamber with propellent fluid is avoided.

The above and further objects and advantages of the invention will be apparent to those skilled in the art upon a reading of the subjoined description and claims in conjunction with the accompanying drawing, in which:

Fig. 1 is a diagrammatic view of an aspirator installation;

Fig. 2 is a central longitudinal section of an aspirator and related parts; and

Fig. 3 is a section on line 3—3 of Fig. 1.

One advantageous installation of the improved type of aspirator, which more specifically forms the subject-matter of the present invention, is illustrated more particularly in Fig. 1 of the accompanying drawings, and comprises a cooler 31 which is connected by a vapor duct 16 with the mixing or head chamber 5 of the aspirator. Energy is imparted to the system by the vaporizer 60 which may be heated by any suitable means, such as the electric resistance element 34, and is connected by an upstanding outlet pipe 61 with a high pressure reservoir or connection 21 which may be a separate element or the end of a pipe 61 adjoining the aspirator nozzle 4. Between nozzle 4 and the vaporizer, the upstanding supply pipe 61 is provided with an expansible and contractable connection 62, which is adapted to protect the nozzle from undue strain due to expansion or contraction of the pipe which may result from its varying temperature. This expansible connection may be of the conventional bellows type, as shown. Such an arrangement is desirable since the various units of the system may be fixedly supported upon any conventional frame, the parts of which will not tend to expand to the same degree as pipe 61, and furthermore since the pipes 62, 22 and 50 will have different temperatures and different degrees of expansion and contraction and would therefore tend to move the nozzle out of alignment with funnel 6, were it not for the protection afforded by the expansible connection.

The aspirator is designed to entrain propellent fluid in a compression duct or funnel 6 which may be air or water cooled in order to effect the condensation of the propellant, the funnel having a suitable outlet comprising an upwardly extending passageway 39 which is adapted to emit vapor into the separating chamber 36. A depending drain 33 is provided for the lowest part of funnel 6 and joins a drain 22 from the mixing chamber; these drain pipes together holding static fluid columns to balance the vapor pressure in vaporizer 60. A refrigerant condenser 2 is connected to the upper part of separating chamber 36 and is provided with any suitable cooling means, such as fins 50. At the lower part of the separating chamber 36 is a duct 23, the lower end of which terminates in a trap 40 having a horizontal connection 45 with cooler 31. A drain 51 including a liquid trap 52 may permit the passage of propellant from the bottom of the cooler 31 to the pipe 22 and boiler 13.

A refrigeration system of the type disclosed herein is more particularly adapted for use with a propellent fluid having a comparatively high density and boiling point in comparison with the density and boiling point of the refrigerant, so that the propellant may efficiently aspirate the refrigerant in the mixing chamber and so that the propellant may be condensed out of the refrigerant in compression and condenser funnel 6; the condensation of the refrigerant later taking place in condenser 2 at a lower temperature.

While the foregoing description and corresponding disclosure illustrate one typical installation of the improved aspirator more particularly forming the subject-matter of the present invention, it is to be understood that such an installation is merely illustrative and that the various advantageous component features of the improved aspirator may be equally desirable in many other installations.

The aspirator nozzle 4 projects substantially at right angles from high pressure chamber 21 and may be of any desired flared shape which is most consistant with the efficiency of aspiration for the particular type of propellant and propelled fluids and accompanying conditions of temperature and pressure. A suitable opening 42, normally provided with a screw plug 43, may be located in chamber 21 opposite nozzle 1 to facilitate original manufacture and assembly of the apparatus. The outlet of nozzle 4 is preferably located within a mixing or head chamber 5, the crowned head of which may be of thin metal having low heat conduction as disclosed in the copending application of Ernest W. Wescott, Serial No. 163,372 filed on even date herewith. The vapor duct 16 is adapted to conduct propelled fluid such as evaporated refrigerant into the mixing chamber where the particles thereof may be entrained in the rapidly moving current of propellent fluid; the drain or outlet 22 being provided for condensed propellent fluid at this point.

In concentric alignment with aspirator tube 4 and projecting into the opposite wall of the mixing chamber is the compression funnel 6 having an outwardly flared inlet and an intermediate passage of restricted size, thus being adapted to receive the mixture of propellant and propelled fluids and to effect the compression of the latter. The funnel 6 while shaped to induce the most efficient pumping action, may also conveniently comprise a condenser for the propellent fluid, as disclosed in the aforesaid copending applications, either being air cooled as shown in Fig. 1 or being provided with a suitable water jacket 10 having inlet and outlet pipes 11 and 12, Fig. 2, through which circulation of cooling water may take place.

It is desirable to minimize heat conduction between chamber 21 and mixing chamber 5, thus reducing the total amount of heat energy which must be imparted to the system, as well as permitting the provision of a smaller cooling capacity for condenser 6 than would be otherwise necessary. The aspirator nozzle is therefore preferably formed of metal having low heat conductivity, for example, a nickel chromium steel, or an alloy of nickel and chromium such as nichrome. This tube or nozzle is provided with a wall having the minimum thickness compatible with the requirements of mechanical strength. In order not only to permit the formation of the tube out of thin metal but also in order most effectively to draw the propelled fluid into the current of propellent fluid, the outlet end of the nozzle projects inwardly beyond the head of the mixing chamber for the purpose of obtaining effective entrainment of the refrigerant vapor in the propellent vapor stream. The expansible coupling 62 in the hot vapor pipe 61 prevents the imposition of undue strain upon the nozzle and permits it to remain in accurate alignment with the compression and condenser funnel, whereby the maximum efficiency of fluid flow may result.

Since aspirator nozzle 4 as well as the head of mixing chamber 5 may be made of comparatively thin metal which may be accidentally bent or twisted so that the nozzle is moved out of accurate alignment with the compression funnel 6, it is desirable to provide means exteriorly arranged upon the apparatus to indicate whether or not the nozzle is in its proper accurately aligned position. For this purpose, an indicator element 70 preferably is secured to high pressure chamber 21 in order to project outwardly in alignment with the central longitudinal axis of the nozzle, while a U-shaped bracket 65 has its legs secured to opposite sides of the mixing chamber 5 (Fig. 3). This bracket has its bight portion provided with a bolt 66 which is adapted to clamp a plate 67 thereto. Plate 67 is provided with an enlarged opening adapted to receive the bolt and to permit its adjustment in relation to bracket 65, being also provided with a depending projection 69, the end of which is adapted to be in close juxtaposition to the end of pointer 70, as shown in Fig. 3, when the nozzle is in its properly aligned relation to the compression funnel. However, if for any reason the nozzle is accidentally moved out of accurate alignment, the end of indicator element 70 will be moved out of its normal position close to the end of projection 69. Since, however, the connection 62 is flexible, the pipe portion 61 may be moved in any suitable manner to return the nozzle 4 and pointer 70 to their normal positions. Obviously the plate 67 is clamped in its proper adjusted position when the machine is initially assembled and the nozzle 4 and funnel 6 are originally aligned. Thereafter the plate remains fixed in place and nozzle 4, together with pointer 70, may be returned to proper position without interference with the interior of the apparatus.

I claim:

1. In apparatus of the class described, an aspirator nozzle adapted to conduct propellent fluid from a region of high temperature and pressure to a region of low temperature and pressure, a chamber adapted to contain fluid at high pressure and temperature and having an outlet into the nozzle, a mixing chamber at the outlet of the nozzle, said nozzle being formed of metal having a comparatively low heat conductivity and comprising the sole connection between the two chambers.

2. In apparatus of the class described, an aspirator nozzle adapted to conduct propellent fluid from a region of high temperature and pressure to a region of low temperature and pressure, a chamber adapted to contain fluid at high pressure and temperature and having an outlet into the nozzle, and a mixing chamber having an inlet provided by the outlet of the nozzle, the nozzle comprising a tapered tube and forming the major path of heat conduction between the two chambers, said nozzle being formed of metal having a comparatively low heat conductivity and being provided with walls of a minimum thickness consistent with suitable mechanical strength.

3. In apparatus of the class described, a source of propellent fluid at high pressure and temperature, an aspirator nozzle, a duct between said source and the inlet of the nozzle, a mixing chamber surrounding the outlet of the nozzle, a compression passage of restricted cross section in alignment with the outlet of said nozzle, a portion of said duct being flexible to permit the nozzle and the passage to remain in alignment under variations in the temperature of said duct.

4. Apparatus of the class described comprising an aspirator nozzle, a mixing chamber, a compression duct in alignment with the nozzle outlet and forming an outlet for the chamber, said chamber being provided with an inlet for propelled fluid and an outlet for exhausted propellent fluid, said last-named outlet being so located in relation to the nozzle outlet and propelled fluid inlet that propellent particles exhausted by impinging upon the aspirated fluid may drop to said outlet.

5. Apparatus of the class described comprising a nozzle, a propellent vaporizer, a pipe between said vaporizer and the inlet of said nozzle, a condenser duct adjoining the outlet of said nozzle and aligned therewith, a drain at the end of said duct which is remote from the nozzle, said drain connecting with the vaporizer and being adapted to hold a liquid column to balance the vapor pressure of the propellant, said duct having a moderate downward inclination from said nozzle to permit drainage of condensed propellant and yet to avoid undue length in the pipe between the vaporizer and the nozzle inlet.

6. In apparatus of the class described, a source of propellent fluid at high pressure and temperature, an aspirator nozzle, a duct between said source and the inlet of the nozzle, a mixing chamber surrounding the outlet of the nozzle, the aspirator nozzle forming the sole direct mechanical connection between the duct and the chamber, a compression passage of restricted cross-section in alignment with said nozzle, and an expansible coupling in said duct, whereby variations in the temperature of the duct will not throw an undue strain upon the aspirator nozzle to move the same out of accurate alignment with the compression passage with a consequent decrease in pumping efficiency.

7. In apparatus of the class described, a source of propellent fluid at high pressure and temperature, an aspirator nozzle, said nozzle having thin walls to lower its heat conductivity, a duct between said source and the inlet of the nozzle, a mixing chamber surrounding the outlet of the nozzle, the aspirator nozzle forming the sole direct mechanical connection between the duct and the chamber, a compression passage of restricted cross-section in alignment with said nozzle, and a flexible coupling comprising a metal bellows in said duct, whereby variations in the temperature of the duct will not throw an undue strain upon the aspirator nozzle to move the same out of accurate alignment with the compression passage with a consequent decrease in pumping efficiency.

Signed by me at Boston, Massachusetts, this 20th day of December, 1926.

LYMAN F. WHITNEY.